April 5, 1960
C. E. ZURCHER
2,932,004
MOTORIST IDENTIFICATION LIGHT ASSEMBLY
Filed Jan. 6, 1959
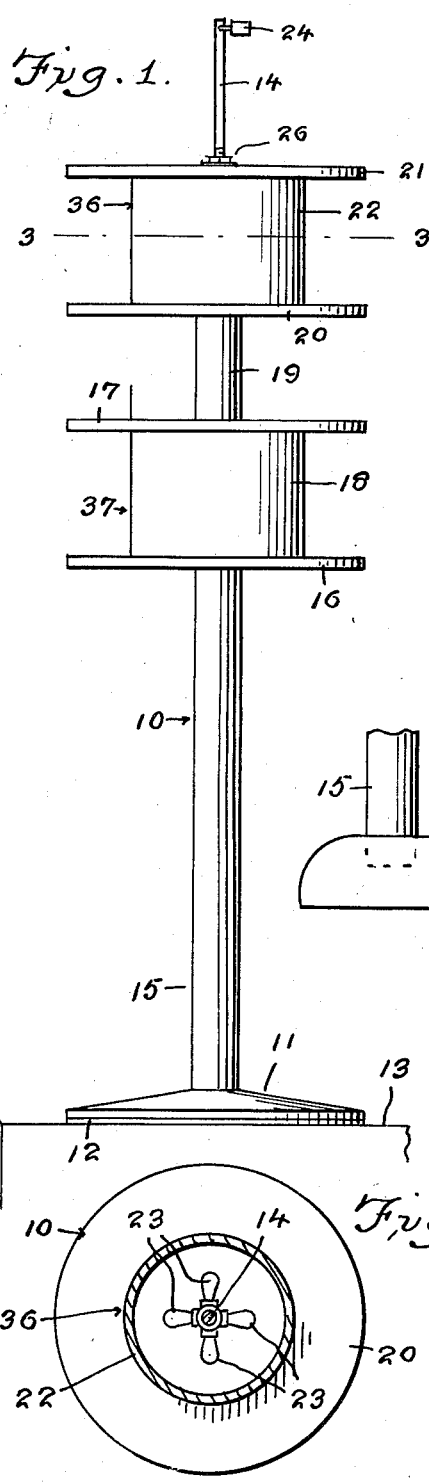
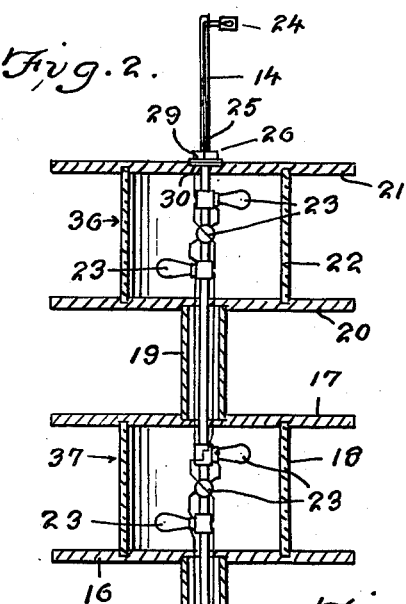
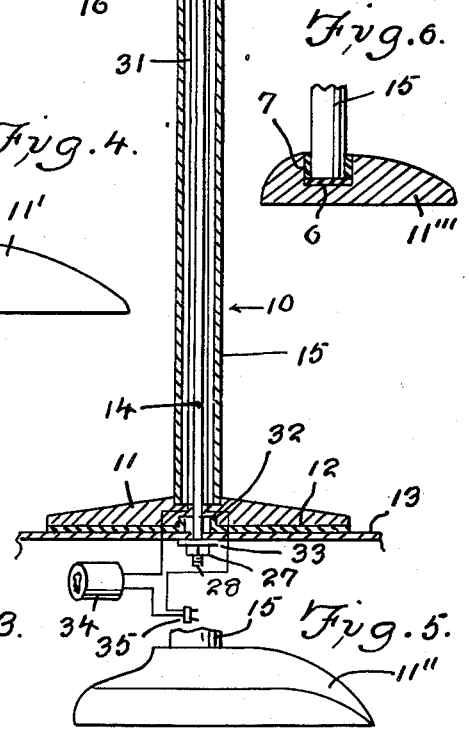
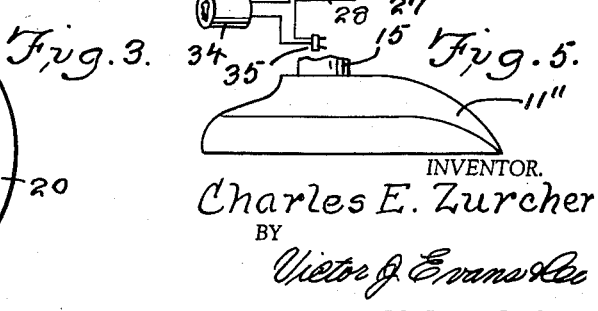
INVENTOR.
Charles E. Zurcher
BY
Victor J. Evans & Co.
ATTORNEYS 2,932,004

MOTORIST IDENTIFICATION LIGHT ASSEMBLY

Charles E. Zurcher, San Antonio, Tex.

Application January 6, 1959, Serial No. 785,239

2 Claims. (Cl. 340—84)

This invention relates to a light assembly, and more particularly to a light assembly for a vehicle.

The object of the invention is to provide a light assembly which is adapted to be connected to a vehicle such as an automobile so that persons outside of the vehicle will be given a visual indication of the capabilities and driving conduct of the driver of the vehicle.

Another object of the invention is to provide a light assembly which is adapted to be conveniently mounted on a vehicle such as an automobile, truck or the like, and wherein different colors or lighting effects are provided so that persons outside of the vehicle will be able to determine certain characteristics relating to the driver or operator of the vehicle.

A further object of the invention is to provide a vehicle lighting assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the vehicle light assembly of the present invention.

Figure 2 is a vertical sectional view taken through the vehicle light assembly.

Figure 3 is a sectional view taken on the line 3—3 of Figure 1.

Figure 4 is a fragmentary sectional view illustrating a modification.

Figure 5 is a fragmentary elevational view of another modification.

Figure 6 is a fragmentary sectional view of a further modification.

Referring in detail to the drawings, the numeral 10 indicates the light assembly of the present invention which is shown to comprise a base 11 that may have a shim 12 arranged therebelow, and the base 11 is adapted to be arranged contiguous to a portion of a vehicle such as an automobile as indicated by the numeral 13.

Extending through the base 11 and projecting upwardly therefrom is a vertically disposed rod 14. The numeral 15 indicates a cylindrical spacer which surrounds the lower portion of the rod 14 and which extends upwardly from the base 11, and arranged adjacent the upper portion of the spacer 15 are first and second spaced parallel horizontally disposed circular plates 16 and 17. The numeral 18 indicates a cylindrical lens which is interposed between the plates 16 and 17.

The numeral 19 indicates a second spacer which is arranged above the plate 17, and the spacer 19 is of cylindrical formation and also surrounds a portion of the rod 14. Arranged above the spacer 19 are third and fourth spaced parallel horizontally disposed circular plates 20 and 21, and the numeral 22 indicates a lens which is interposed between the plates 20 and 21. The numeral 23 designates each of a plurality of light bulbs which may be supported by the rod 14 and these bulbs are adapted to be connected to a suitable source of electrical energy such as a vehicle battery or vehicle ignition system.

Referring to Figures 4 and 5, the numerals 11' and 11" indicate different shapes of bases which can be used instead of the base 11.

The numeral 24 indicates a seal which may be connected to the upper end of the rod 14.

An upper portion of the rod 14 is threaded as at 25, and a locknut 26 is arranged in threaded engagement with the portion 25. The numeral 27 indicates a lower locknut which is arranged in engagement with a lower threaded portion 28 of the rod 14.

From the foregoing, it is apparent that there has been provided a light assembly for a vehicle, and the bulbs such as the bulbs 23 can be actuated or energized in such a manner so that persons outside of the vehicle will be given a visual indication of the capabilities and driving conduct of the person in the vehicle.

The parts can be made of any suitable material and in different shapes or sizes.

In the drawings the numeral 24 indicates a lead and wire seal, and the rod 14 is provided with the upper threaded portion 25. An upper locknut 26 is arranged in engagement with the portion 25, and an upper lock washer 29 as well as a spacer alinement or centering washer 30 are provided as shown in Figure 2. The plate 21 defines the top of the upper light, and suitable alinement recesses are provided in the various plates. The numeral 22 indicates the lens of the upper light, and bulbs 23 as well as sockets are provided in the upper and lower lights. The numeral 20 indicates the bottom of the upper light, and a short spacer 19 is provided as shown in the drawings, and the plates 17 and 16 define the top and bottom of the lower light. The numeral 18 indicates the lens for the lower light, and a hot wire 31 is connected to the bulbs, and this wire may be connected to an armored cable at the base. The long spacer 15 is arranged above the base 11, and the base 11 may be provided with a recess for receiving the bottom of the spacer 15. The shim 12 may be made of a suitable material such as rubber so as to conform to the curvature or contour of the fender 13 of the vehicle. The center rod 14 is arranged as shown, and the lead and wire seal 24 may be arranged in engagement with an opening in the upper end of the rod 14. A locknut 32 can be provided for helping to maintain the device connected to the vehicle fender 13 and a lock washer 33 is arranged contiguous to the lower locknut 27 for the fender. A suitable armored cable can lead from a switch to the light assembly, and such a switch is indicated by the numeral 34 in Figure 2 and may be similar to an ignition switch of the key type. The numeral 35 indicates a connection which can lead to the conventional vehicle ignition switch.

The light assembly of the present invention may be mounted in a convenient location on the automobile or vehicle such as adjacent the right front fender just ahead of the windshield so that persons outside a vehicle will be able to ascertain the capability and conduct of the vehicle displaying the lights. For example if both the upper and lower lights as indicated by the numerals 36 and 37 are green, it means that the driver is capable and has not violated any laws. The top light 36 is for conduct and the lower light 37 for ability. If the lights show top amber lower green it means a capable person that has violated. Another combination such as top green and lower amber means conduct is all right. But ability under average such as when an elderly person is driving or one with poor sight or some other defect, then the latter characteristics are indicated. It is contemplated that legislation may be enacted to color code all drivers as to ability and conduct and it is believed that such a provision would eliminate accidents to a large extent which is an important national problem. Furthermore, law enforcement officers could concentrate their attention on the ones who had an amber light or two and especially watch the vehicle with no lights at all.

Other arrangements can be provided for using the lights, as for example persons purchasing or obtaining the light assembly may agree to drive to the best of their ability and request the department of public safety of their respective State to change the color of that person's light for a certain period of time and affix a seal such as the seal 24 at the top to prevent alteration. This statement would request any law enforcement officer that if they saw this vehicle running with lights not burning to stop the vehicle since it may be stolen. The separate lock and key for the lights should discourage auto thefts and the lights would burn at all times day or night when the vehicle is in operation. Anyone purchasing the light assembly would be issued a double green and if they didn't "do right" they would have their colors changed and the light assembly would appeal to a person's pride or vanity so that a psychological approach to the problem would be present.

The long spacer 15 could be used as a radio antenna since it would be insulated from the fender. The light assembly would be approximately three feet tall.

The lenses may be made of plastic and the entire assembly is compressed together between the fender and locknut 26 as shown in the drawings.

In order to change burnt out bulbs, it is only necessary to loosen and raise the top locknut. In the event that the assembly is sealed at the top, there would be enough room to change bulbs but not the lenses. Certain of the parts may be made of similar construction and shape so as to lower cost of manufacture. The various parts are made of material which is heavy enough so that when the assembly is compressed at the time of installation, no distortion occurs and the assembly is rigid and stable enough so that it will not bend due to wind resistance. The light bulbs are of sufficient candle power to enable one to discern in daylight at a distance of twenty-five feet whether or not the lights were burning. By having the device approximately three feet tall, the lights can be observed above the roof top from any angle and the lights could be seen at night without interference from the headlights.

As stated previously the contour of the base can be varied as desired. For example as shown in Figure 4 the base 11' may be offset slightly, or the base may be arranged as shown in Figure 5 and indicated by the numeral 11". The various bases will have a recess for the long spacer. The device may be provided with a suitable number of light bulbs as desired or required.

Referring to Figure 6 of the drawings, the numeral 11''' indicates a further modified base which is provided with a fiber sleeve 7 and a fiber washer 6 and these members will provide insulation for the parts when the parts are made of metal, and as for example when a member such as the member 15 is being used as a radio antenna.

Minor changes in shape, size and rearrangement of details coming within the field of invention claimed may be resorted to in actual practice, if desired.

I claim:

1. In a light assembly for a vehicle, a base arranged contiguous to a portion of the vehicle body, a vertically disposed rod extending upwardly from said base, a cylindrical spacer surrounding said rod and extending upwardly from said base, first and second horizontally disposed spaced parallel plates arranged above said spacer, a cylindrical lens interposed between said pair of plates, a second spacer arranged above said first and second plates, third and fourth spaced parallel horizontally disposed plates arranged above said second spacer, a cylindrical lens interposed between said third and fourth plates, and a plurality of light bulbs arranged within each lens, said lenses being of different colors.

2. In a light assembly for a vehicle, a base arranged contiguous to a portion of the vehicle body, a vertically disposed rod extending upwardly from said base, a cylindrical spacer surrounding said rod and extending upwardly from said base, first and second horizontally disposed spaced parallel plates arranged above said spacer, a cylindrical lens interposed between said pair of plates, a second spacer arranged above said first and second plates, third and fourth spaced parallel horizontally disposed plates arranged above said second spacer, a cylindrical lens interposed between said third and fourth plates, a plurality of light bulbs arranged within each lens, said lenses being of different colors, said rod including a threaded portion adjacent its upper end, a securing element engaging said threaded portion, a securing element engaging the lower end of the rod for maintaining the light assembly connected to a portion of the vehicle body, and a switch electrically connected to said light bulbs, said light assembly adapted to be connected to a vehicle such as an automobile so that persons outside of the vehicle will be given a visual indication of the capabilities and driving conduct of the driver of the vehicle.

References Cited in the file of this patent

FOREIGN PATENTS 300,013    Great Britain _____ Nov. 8, 1928